United States Patent
Alshawabkeh et al.

(10) Patent No.: US 12,524,159 B1
(45) Date of Patent: Jan. 13, 2026

(54) ADAPTIVE REPLACEMENT OF SOLID-STATE DISKS WITH VARIABLE WEAR RATES

(71) Applicant: Dell Products L.P., Hopkinton, MA (US)

(72) Inventors: Malak Alshawabkeh, Franklin, MA (US); Kuolin Hua, Natick, MA (US)

(73) Assignee: Dell Products L.P., Hopkinton, MA (US)

(*) Notice: Subject to any disclaimer, the term of this patent is extended or adjusted under 35 U.S.C. 154(b) by 0 days.

(21) Appl. No.: 18/818,852

(22) Filed: Aug. 29, 2024

(51) Int. Cl.
G06F 3/06 (2006.01)

(52) U.S. Cl.
CPC .......... *G06F 3/0616* (2013.01); *G06F 3/0653* (2013.01); *G06F 3/0689* (2013.01)

(58) Field of Classification Search
CPC ..... G06F 3/0616; G06F 3/0653; G06F 3/0689
See application file for complete search history.

(56) References Cited

U.S. PATENT DOCUMENTS

| | | | | |
|---|---|---|---|---|
| 9,348,761 | B1* | 5/2016 | Cummins | G06F 3/0605 |
| 2015/0046756 | A1* | 2/2015 | Sreekumaran | G06F 11/008 |
| | | | | 714/47.2 |
| 2017/0115903 | A1* | 4/2017 | Franke | G06F 11/3034 |
| 2021/0080941 | A1* | 3/2021 | Entzminger | G05B 19/41855 |

OTHER PUBLICATIONS

Samsung. S.M.A.R.T Self-Monitoring, Analysis and Reporting Technology, [retrieved on Sep. 29, 2025]. Retrieved from the Internet <URL: https://download.semiconductor.samsung.com/resources/others/SSD_Application_Note_SMART_final.pd> (Year: 2014).*

* cited by examiner

*Primary Examiner* — Larry T Mackall
(74) *Attorney, Agent, or Firm* — Anderson Gorecki LLP

(57) ABSTRACT

An individual adaptive replacement threshold is calculated for each drive of a drive array based on forecasted wear rate, maximum fulfillment time, and wear-life limit. The maximum fulfillment time and wear-life limit are input based on external conditions and design choice. The wear rate for the drive is forecasted using a multiple linear regression/machine learning model in which P/E cycles, POH, WAF, and bytes written are independent variables and wear rate is the dependent variable. The independent variables may be obtained from the drive directly as SMART attributes, or calculated using SMART attributes. The wear-life state of the drive, which is also obtained from the drive directly as, or calculated using, SMART attributes, is compared with the adaptive replacement threshold of the drive. Replacement of the drive is prompted based on the wear-life state of the drive satisfying the adaptive replacement threshold of the drive.

20 Claims, 5 Drawing Sheets

ADAPTIVE REPLACEMENT OF SOLID-STATE DISKS WITH VARIABLE WEAR RATES

TECHNICAL FIELD

The subject matter of this disclosure is generally related to electronic data storage.

BACKGROUND

Data storage systems such as storage area networks (SANs), network-attached storage (NAS), and software-defined and disaggregated variants thereof are used to maintain data that is accessed by instances of host applications that run on clusters of host servers. Such data storage systems may store data on arrays of solid-state drives (SSDs) that are based on electrically erasable programmable read-only memory (EEPROM) technology such as NAND and NOR flash memory. SSDs have a finite service life that is related to frequency of performance of input-output operations (IOs) that change data, e.g., write operations. SSDs write data in units of storage capacity known as "pages" but can only erase data in larger units of storage capacity known as "blocks." In order to update existing data, e.g., logically overwriting existing data with new data, an SSD stores the new data on a different page than the existing data and marks the existing data as stale on the original page. Blocks that accumulate a sufficient number of stale pages are erased and recycled. SSD memory cells somewhat predictably fail after being subjected to a rated number of such program/erase (P/E) cycles. An SSD is considered to be in a failed state after a certain number or percentage of its memory cells fail. The expected lifespan of an SSD may be expressed as an endurance rating in units of drive writes per day (DWPD) that can be sustained for a certain time period such as 5 years.

SSDs have built-in Self-Monitoring, Analysis, and Reporting Technology (SMART) systems that enable the SSD to detect and report various attributes indicative of drive wear-life state. For example, SMART attribute 169, "Remaining Lifetime Percentage," and SMART attribute 231, "Life Left," are variables that represent the approximate percentage of drive life remaining. An unused SSD will report a value of "100." That value decreases to "0" as the SSD reaches end-of-life. SMART attribute 202, "Percentage of Lifetime Used," is a variable that represents the approximate percentage of the drive's projected lifetime that has been used. An unused SSD will report a value of "0." That value increases to "100" as the SSD reaches end-of-life. It is standard practice in the art to define a single static wear-life threshold value at which replacement of individual SSDs of an array of drives is prompted, e.g., 95% of lifetime used (5% lifetime remaining). Once the wear-life state of a drive reaches the threshold, the process of replacing the drive is initiated. The replacement threshold typically includes a safety margin because drives wear at different rates and drive failures can potentially result in data loss. However, the single static threshold with safety margin does not eliminate the possibility of fast-wearing outlier drives failing before replacement and it also creates inefficiency because slow-wearing drives may have significant remaining wear-life when replaced.

SUMMARY

In accordance with some implementations, a method comprises: for each drive in a drive array, calculating an adaptive replacement threshold for the drive based on forecasted wear rate, fulfillment time, and wear-life limit; comparing wear-life state of the drive with the adaptive replacement threshold of the drive; and prompting replacement of the drive based on the wear-life state of the drive satisfying the adaptive replacement threshold of the drive.

In accordance with some implementations, an apparatus comprises: a plurality of drives; and a compute node comprising a processor, memory, and an operating system, the compute node configured, for each of the plurality of drives, to: calculate an adaptive replacement threshold for the drive based on forecasted wear rate, maximum fulfillment time, and wear-life limit; compare wear-life state of the drive with the adaptive replacement threshold of the drive; and prompt replacement of the drive based on the wear-life state of the drive satisfying the adaptive replacement threshold of the drive.

In accordance with some implementations, a non-transitory computer-readable storage medium stores instructions that when executed by a computer cause the computer to perform a method comprising: for each drive in a drive array, calculating an adaptive replacement threshold for the drive based on forecasted wear rate, fulfillment time, and wear-life limit; comparing wear-life state of the drive with the adaptive replacement threshold of the drive; and prompting replacement of the drive based on the wear-life state of the drive satisfying the adaptive replacement threshold of the drive.

This summary is not intended to limit the scope of the claims or the disclosure. Other aspects, features, and implementations will become apparent in view of the detailed description and figures. Moreover, all the examples, aspects, implementations, and features can be combined in any technically possible way.

DETAILED DESCRIPTION

Some aspects, features, and implementations described herein may include machines such as computers, electronic components, optical components, and processes such as computer-implemented steps. It will be apparent to those of ordinary skill in the art that the computer-implemented steps may be stored as computer-executable instructions on a non-transitory computer-readable medium. Furthermore, it will be understood by those of ordinary skill in the art that the computer-executable instructions may be executed on a variety of tangible processor devices. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation abstractions of tangible features. The term "physical" is used to refer to tangible features. For example, multiple virtual computing devices could operate simultaneously on one physical computing device. The term "logic" is used to refer to special purpose physical circuit elements and software instructions that are stored on a non-transitory computer-readable medium and implemented by multi-purpose tangible processors. The terms "disk" and "drive" are used interchangeably and are not intended to be limited to a particular type of non-volatile data storage media.

Figure 1:
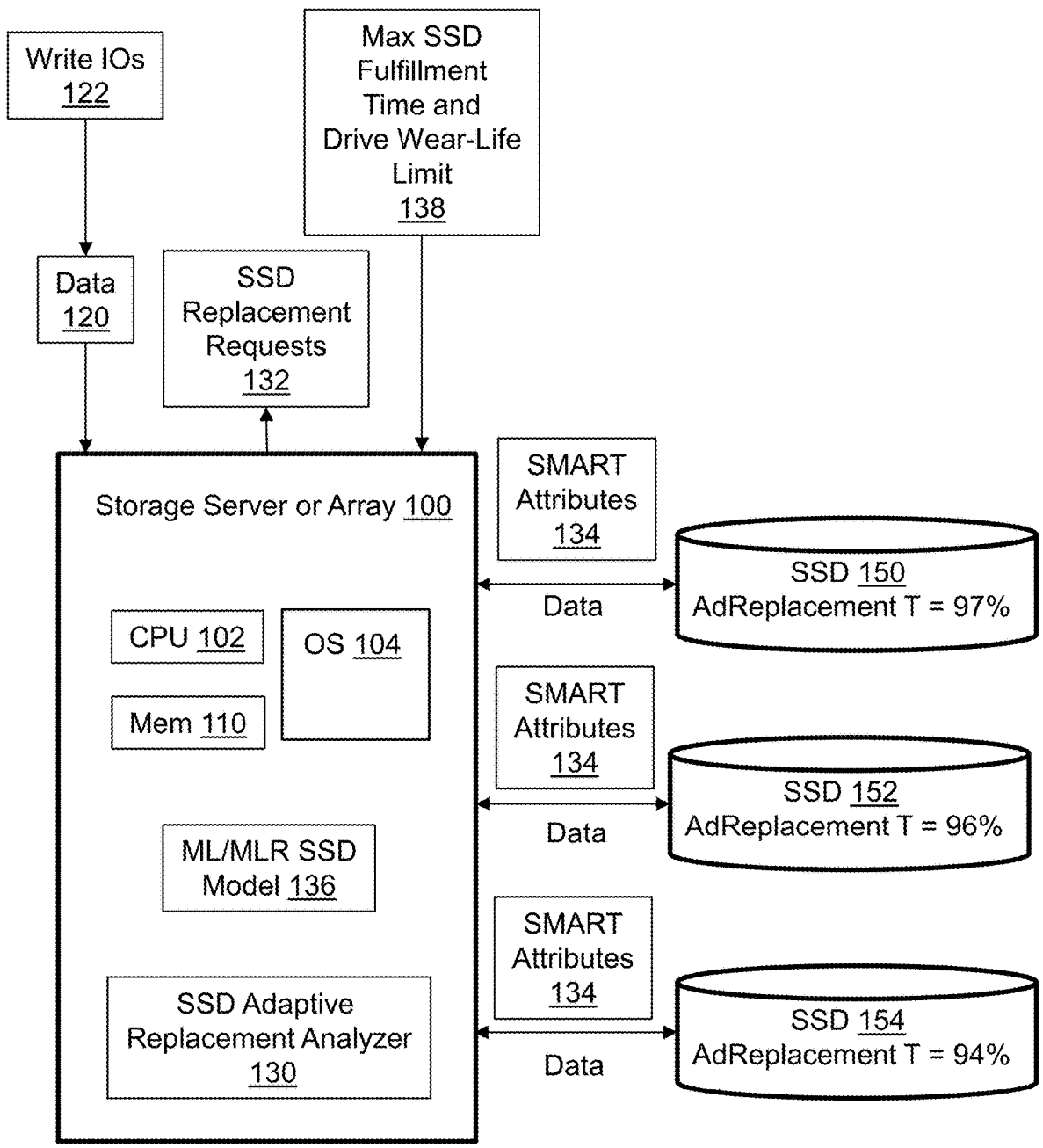
FIG. 1 illustrates a storage system in which per-drive adaptive replacement thresholds are calculated based on forecasted drive wear rate, wear-life limit, and maximum fulfillment time.

FIG. 1 illustrates a storage system in which per-drive adaptive replacement thresholds are calculated based on forecasted drive wear rate, wear-life limit, and maximum fulfillment time. The data storage system includes a storage server or array 100 with at least one multi-core CPU 102, memory bank 110, and operating system (OS) 104. The CPUs include L1 onboard cache. The memory banks include L2/L3 cache and main memory implemented with one or both of volatile memory components such as double data rate synchronous dynamic random-access memory (DDR SDRAM), and non-volatile memory (NVM) such as storage class memory (SCM). Server 100 manages access to respective SSDs 150, 152, 154 that serve as non-volatile local storage. For example, data 120 associated with write IOs 122 from host application instances is stored on the SSDs.

An SSD adaptive replacement analyzer 130, which may be implemented in software and run under the OS using the CPU and memory bank, generates SSD replacement requests 132. Each SSD replacement request prompts replacement of an individual SSD that is approaching the end of its service life. The SSD adaptive replacement analyzer 130 uses SMART attributes 134 obtained from the SSDs 150, 152, 154 as inputs to a machine learning/multiple linear regression (ML/MLR) model 136 to forecast the wear rate of each of the SSDs. Wear rates tend to differ between SSDs. An adaptive replacement threshold is calculated for each respective SSD based on the forecasted wear rate of that SSD and an external input 138 that specifies maximum SSD fulfillment time and drive wear-life limit. The maximum SSD fulfillment time is the maximum amount of time expected to potentially elapse between generation of an SSD replacement request 132 and completion of replacement of the corresponding SSD. Factors that might influence maximum SSD fulfillment time include supply chain latency and ability to schedule staff to perform drive replacement service calls. The drive wear-life limit indicates permissible proximity to end of wear-life. For example, the wear-life limit may correspond to 99% of drive lifetime used (1% drive lifetime remaining). When the wear-life state of an SSD satisfies the adaptive replacement threshold of that SSD, then an SSD replacement request is generated with reference to that SSD. The adaptive replacement thresholds adapt to both differences in wear rates between drives and changes in wear rate of individual drives. As a result, drive lifespans are more fully utilized and drive failures are less likely.

In a specific implementation, drive wear level L (wear-life state represented on the 0-to-100 progression scale) may increase up to Ceiling (L+WT) just before replacement, where W=forecasted wear rate and T=maximum drive fulfillment time. The drive replacement request is generated when L≥Floor (U-WT), where U is the wear-life limit. Consequently, the wear-life state will not exceed the wear-life limit prior to drive replacement. Rounded Ceiling and Floor values are used because drives report wear level as an integer stepping function. For context, given a maximum SSD fulfillment time of 18 days, a wear-life limit of 99% lifetime used, and a forecasted wear rate of 0.054% per day, the adaptive replacement threshold will be Floor (99-0.97) =98%. If the forecasted wear rate is 0.27% per day, the wear level may increase by 4.85% during the 18-day interval, so the adaptive replacement threshold will be Floor (99-4.85) =94%. In the illustrated example, SSD 150 has an adaptive replacement threshold of 97% (which may correspond to a low wear rate drive), SSD 152 has an adaptive replacement threshold of 96% (which may correspond to an average wear rate drive), and SSD 154 has an adaptive replacement threshold of 94% (which may correspond to a fast wear rate drive). Adjustment of the algorithm for wear-life state represented on the 100-to-0 progression scale should be readily apparent to those of ordinary skill in the art.

Figure 2:
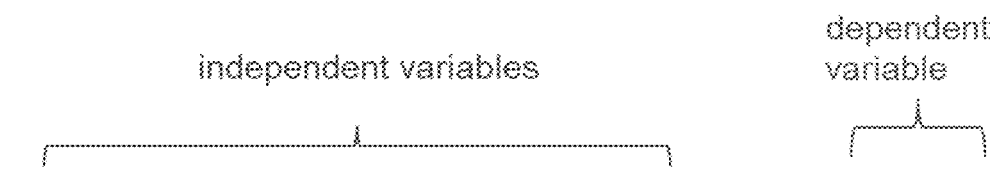
FIG. 2 illustrates SMART attributes that are used to model drive wear rate.
Figure 3:
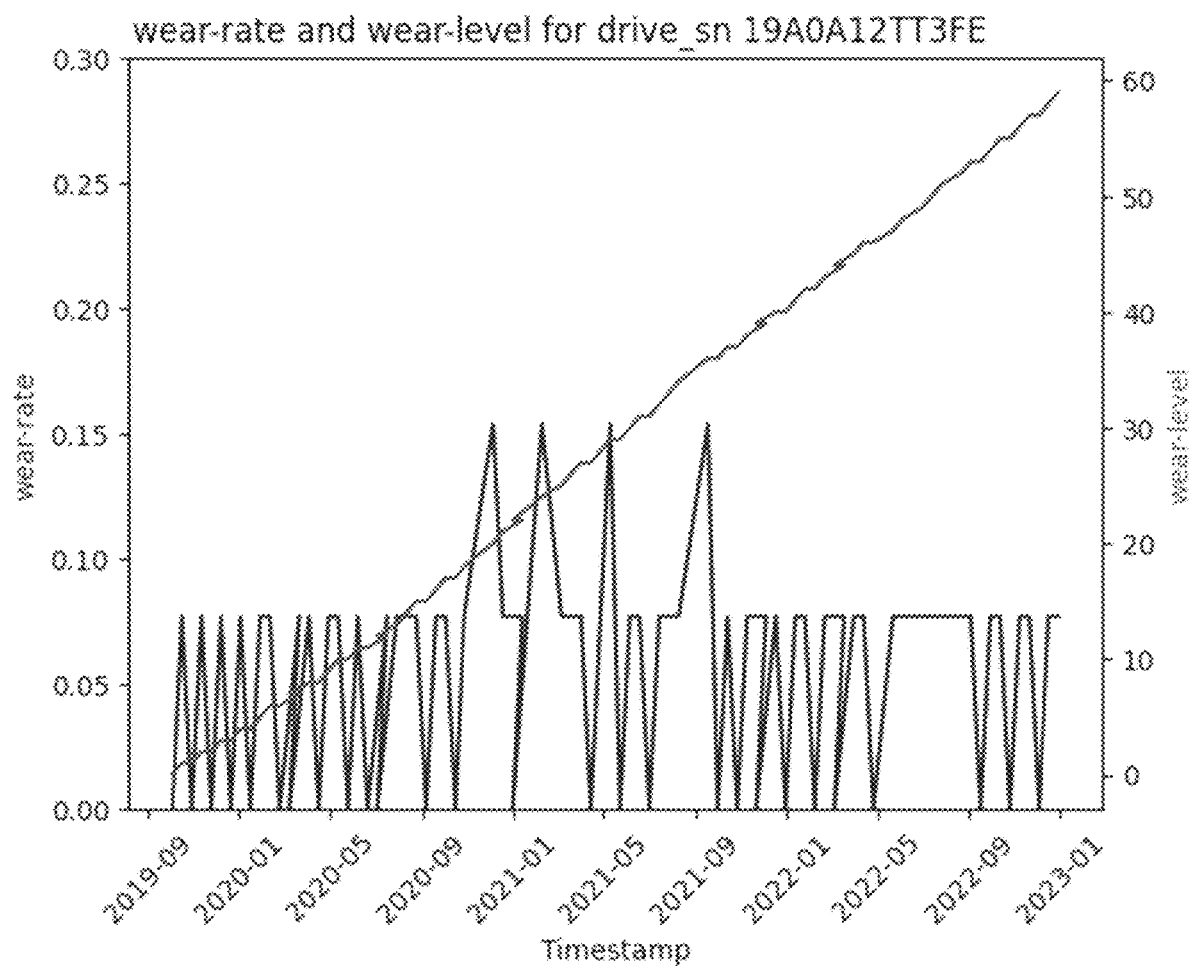
FIG. 3 illustrates the relationship between wear rate and wear level for an exemplary SSD.
Figure 4:
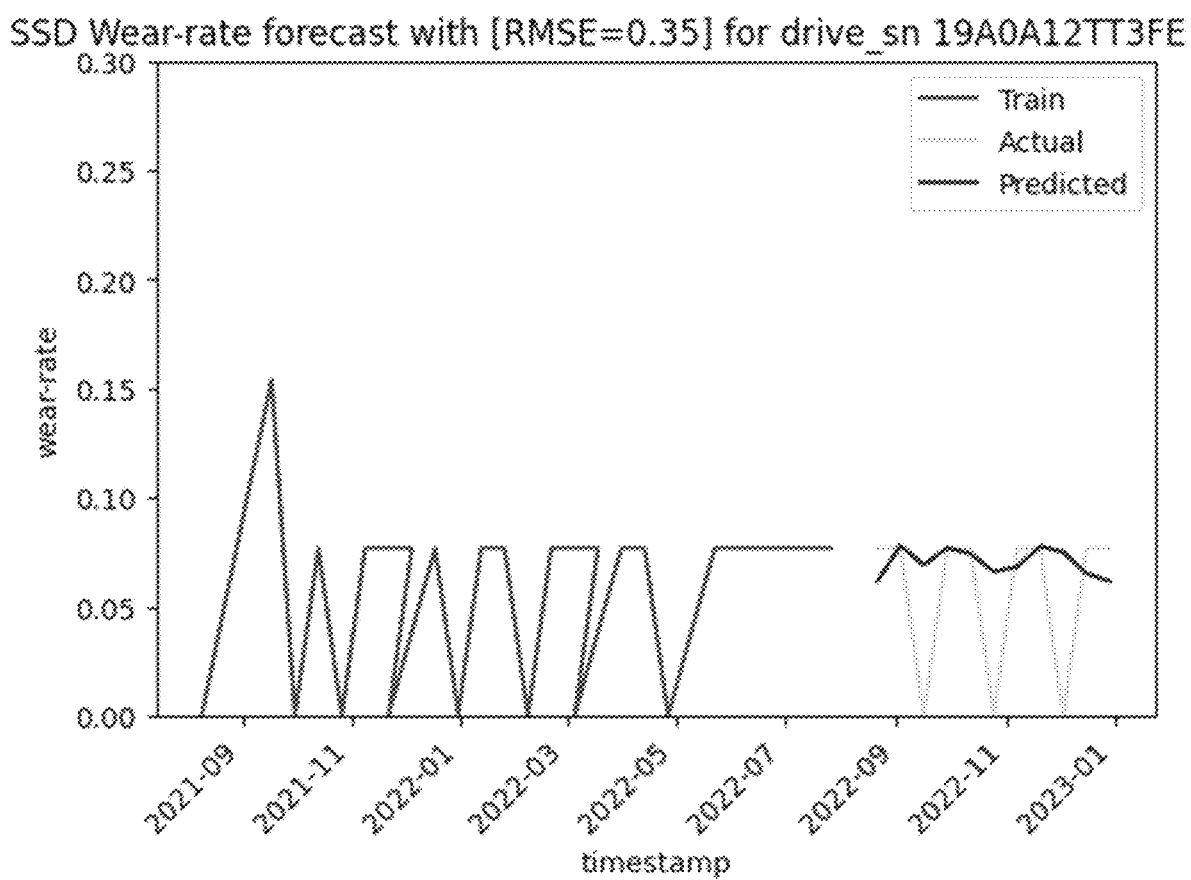
FIG. 4 illustrates a wear rate forecast for the SSD of FIG. 3.

Referring to FIGS. 2, 3, and 4, SMART attributes are used to model drive wear rate using MLR or machine learning. In the illustrated example, program erase (P/E) cycles, number of power-on-hours (POH), write amplification factor (WAF), and bytes written are used as independent variables and wear rate is the dependent variable. P/E cycles may be indicated by SMART attribute 173 which represents the maximum worst erase count on a single block. POH may be indicated by SMART attribute 9 "Power On Hours." WAF may be calculated by dividing NAND writes (SMART attribute 233 or 249) by host writes (SMART attribute 241). Bytes written may be indicated by SMART attribute 241, 242, 243, or 246. However, the specific SMART attributes mentioned above are not to be viewed as limiting and other SMART attributes and statistical data may be used. The MLR forecast model may be calculated as:

$$Y = \beta_0 + \beta_1 X_1 + \beta_2 X_2 + \ldots + \beta_n X_n + \varepsilon, \text{ where}$$

Y is the dependent variable (wear rate),

X are independent variables, $\beta_0, \ldots, \beta_n$ are coefficients, representing the effect of each independent variable on the dependent variable, and $\varepsilon$ is the error term, representing the difference between the observed and predicted values of the dependent variable.

The coefficients function as weights relative to their associated input features. The magnitude of the coefficient represents the strength of correlation between the input feature and the target dependent variable. The larger the absolute value of the coefficient, the more significant the corresponding input feature is in predicting the target dependent variable. A positive coefficient indicates that an increase in the corresponding input feature will result in an increase in the target dependent variable, while a negative coefficient indicates the opposite. Once the model has been calculated/trained, values for the independent variables obtained from SMART attributes can be used to forecast individual wear rates for each SSD in the drive array. Those wear rates are then used to calculate individual adaptive replacement thresholds.

Figure 5:
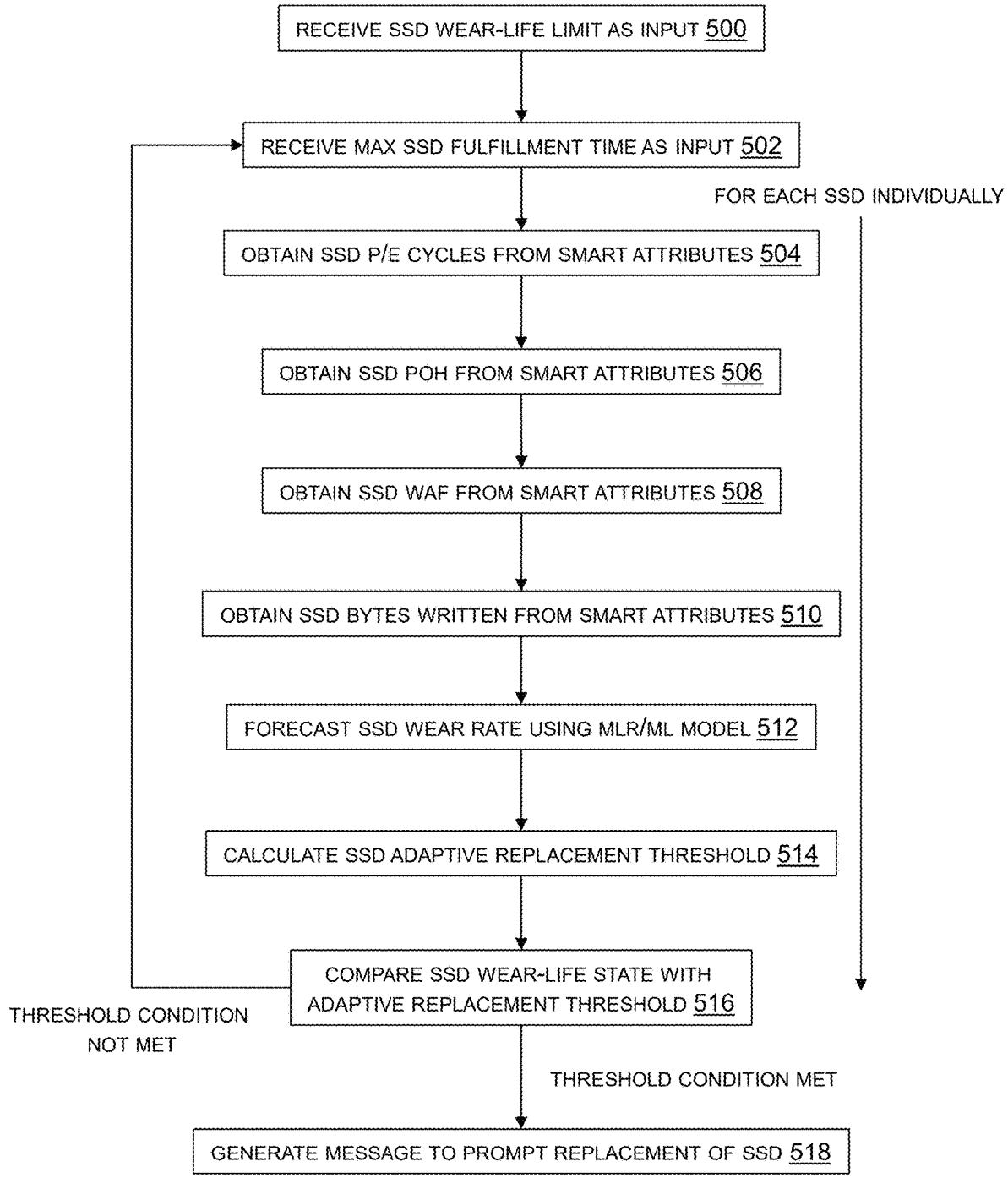
FIG. 5 illustrates a method for adaptive replacement of SSDs with variable wear rates.

FIG. 5 illustrates a method for adaptive replacement of SSDs with variable wear rates. Step 500 is receiving a drive wear-life limit as input. The drive wear-life limit indicates permissible proximity to end of wear-life. For example, the wear-life limit may correspond to 99% of drive lifetime used (1% drive lifetime remaining). A single wear-life limit value may be applied to all drives in the array. Step 502 is receiving maximum fulfillment time as an input. The maximum fulfillment time is the maximum amount of time expected to potentially elapse between generation of an SSD replacement request and completion of replacement of the corresponding SSD. A single maximum fulfillment time value may be applied to all drives in the array and the value may be updated based on changing conditions. The other steps are performed on a per-drive basis. Step 504 is obtaining an indication of P/E cycles from SMART attributes. Step 506 is obtaining an indication of POH from SMART attributes. Step 508 is obtaining an indication of WAF from SMART attributes. Step 510 is obtaining an indication of bytes written from SMART attributes. Step 512 is using the MLR/ML model to forecast wear rate of the drive using the SMART attribute values as inputs. Step 514 is calculating an adaptive replacement threshold for the drive based on forecast wear rate, wear-life limit, and maximum fulfillment time. The drive wear-life state is obtained from SMART attributes and compared with the adaptive replacement threshold in step 516. If the threshold condition is not met, then flow returns to step 502. If the threshold condition is met, then a message is generated to prompt replacement of the drive as indicated in step 518. Satisfying the threshold condition may be indicated, for example, and without limitation, by the wear-life state (adjusted to the 0-to-100 representation if necessary) equaling or exceeding the adaptive replacement threshold.

Advantages are not to be viewed as limitations but at least some implementations help to improve efficiency by avoiding premature replacement of slow-wearing drives. Further, at least some implementations help to avoid data loss that could result from failure of fast-wearing drives. Aspects can also adapt to variations in wear rate between drives and also variations of wear rate of individual drives. Further, drive replacement can be dynamically adapted to changes in drive fulfillment timing.

A number of features, aspects, embodiments, and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. A method comprising:
    for each drive in a drive array,
        calculating an adaptive replacement threshold for the drive based on forecasted wear rate, maximum fulfillment time, and wear-life limit;
        comparing wear-life state of the drive with the adaptive replacement threshold of the drive; and
        prompting replacement of the drive based on the wear-life state of the drive satisfying the adaptive replacement threshold of the drive.

2. The method of claim 1 further comprising calculating the forecasted wear rate using a multiple linear regression or machine learning model in which wear rate is a target dependent variable.

3. The method of claim 2 further comprising inputting program/erase cycles to the model as an independent variable.

4. The method of claim 3 further comprising inputting power-on-hours to the model as an independent variable.

5. The method of claim 4 further comprising inputting write amplification factor to the model as an independent variable.

6. The method of claim 5 further comprising inputting bytes written to the model as an independent variable.

7. The method of claim 6 further comprising calculating the adaptive replacement threshold as Floor (U-WT), where U is the wear-life limit, W is the forecasted wear rate, and T is the maximum fulfillment time.

8. An apparatus comprising:
    a plurality of drives; and
    a compute node comprising a processor, memory, and an operating system, the compute node configured, for each of the plurality of drives, to:
        calculate an adaptive replacement threshold for the drive based on forecasted wear rate, maximum fulfillment time, and wear-life limit;
        compare wear-life state of the drive with the adaptive replacement threshold of the drive; and
        prompt replacement of the drive based on the wear-life state of the drive satisfying the adaptive replacement threshold of the drive.

9. The apparatus of claim 8 further comprising the compute node configured to calculate the forecasted wear rate using a multiple linear regression or machine learning model in which wear rate is a target dependent variable.

10. The apparatus of claim 9 further comprising program/erase cycles being an independent variable of the model.

11. The apparatus of claim 10 further comprising power-on-hours being an independent variable of the model.

12. The apparatus of claim 11 further comprising write amplification factor being an independent variable of the model.

13. The apparatus of claim 12 further comprising bytes written being an independent variable of the model.

14. The apparatus of claim 13 further comprising the adaptive replacement threshold being calculated as Floor (U-WT), where U is the wear-life limit, W is the forecasted wear rate, and T is the maximum fulfillment time.

15. A non-transitory computer-readable storage medium storing instructions that when executed by a computer cause the computer to perform a method comprising:
    for each drive in a drive array,
        calculating an adaptive replacement threshold for the drive based on forecasted wear rate, maximum fulfillment time, and wear-life limit;
        comparing wear-life state of the drive with the adaptive replacement threshold of the drive; and
        prompting replacement of the drive based on the wear-life state of the drive satisfying the adaptive replacement threshold of the drive.

16. The non-transitory computer-readable storage medium of claim 15 in which the method further comprises calculating the forecasted wear rate using a multiple linear regression or machine learning model in which wear rate is a target dependent variable.

17. The non-transitory computer-readable storage medium of claim 16 in which the method further comprises inputting program/erase cycles to the model as an independent variable.

18. The non-transitory computer-readable storage medium of claim 17 in which the method further comprises inputting power-on-hours to the model as an independent variable.

19. The non-transitory computer-readable storage medium of claim 18 in which the method further comprises inputting write amplification factor and bytes written to the model as independent variables.

20. The non-transitory computer-readable storage medium of claim 19 in which the method further comprises calculating the adaptive replacement threshold as Floor (U−WT), where U is the wear-life limit, W is the forecasted wear rate, and T is the maximum fulfillment time.

\* \* \* \* \*